United States Patent [19]

Lai

[11] 4,416,231
[45] Nov. 22, 1983

[54] LOW SPEED AIR BLEED ABSORPTION REDUCER OIL SAVING DEVICE FOR CARBURETOR

[76] Inventor: Min D. Lai, 5Fl., No. 7, Alley 21, Lane 239, Pa Ter Rd., Sec. 2, Pan Shiao City, Taipei Hsien, Taiwan

[21] Appl. No.: 350,702

[22] Filed: Feb. 22, 1982

[51] Int. Cl.³ ............................................. F02M 23/08
[52] U.S. Cl. ..................................... 123/327; 123/587
[58] Field of Search ............... 123/587, 585, 575, 327; 261/18 B, 63, 67, DIG. 1; 48/180 A

[56] References Cited

U.S. PATENT DOCUMENTS

| | | | |
|---|---|---|---|
| 3,140,700 | 7/1964 | Nallinger | 123/575 |
| 3,463,132 | 8/1969 | Krieck | 123/587 |
| 4,103,654 | 8/1978 | Nakamura | 123/587 |

Primary Examiner—William A. Cuchlinski, Jr.
Attorney, Agent, or Firm—Karl W. Flocks; A. Fred Starobin

[57] ABSTRACT

A low speed air bleed absorption reduction oil saving device for carburetor characterized in the ability to turn air valve to open automatically in circumstances where the automobile concerned is reducing its speed, going downhill or the carburetor is experiencing a momentous absorption internally such that the rotation speed of the engine remains above 950 RPM, equivalent to a speed in motion that is higher than 25 Kms per hour as executed by the high-speed gear, so as to enable the air to enter the cylinder via the air filter so as to hold down the vacuum absorption so as to prevent overfilling of gasoline into the cylinder thereby achieving the objective of saving of use of gasoline fuels.

3 Claims, 1 Drawing Figure

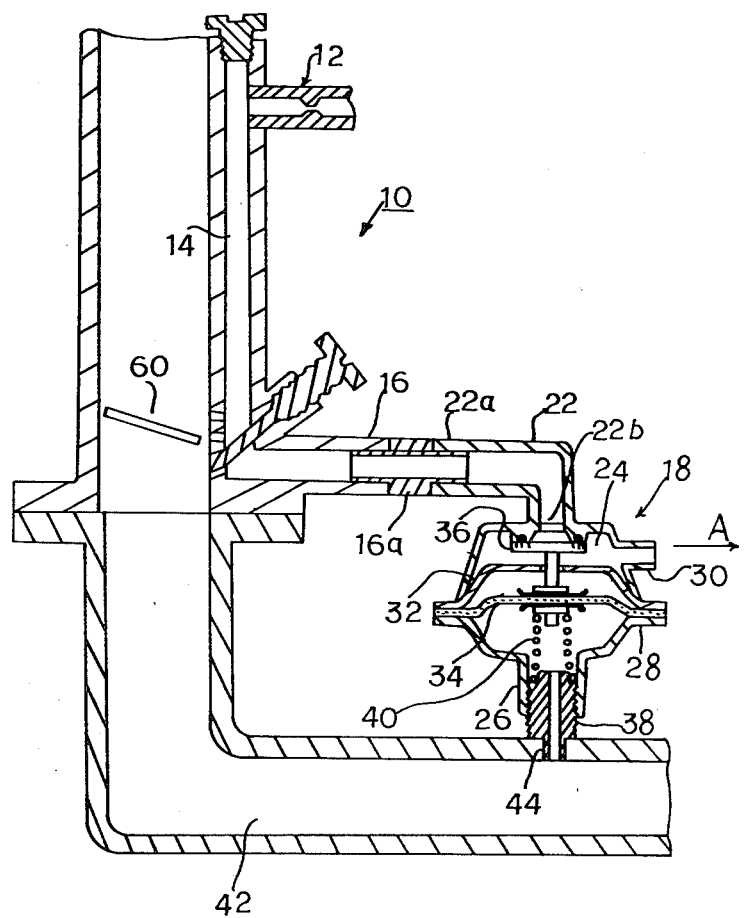

LOW SPEED AIR BLEED ABSORPTION REDUCER OIL SAVING DEVICE FOR CARBURETOR

SUMMARY OF THE INVENTION

The present invention provides for a low speed air bleed absorption reduction oil saving device for the carburetor of automobiles, specifically it means a device which is able to turn the air valve to open automatically in circumstances where the automobile concerned is reducing its speed, going downhill or the carburetor thereof is experiencing a drastic absorption internally such that the rotation speed of the engine remains above 950 RPM so as to enable the air to enter the cylinder via the air filter so as to prevent overfilling of gasoline fuel into the cylinder thus achieving the objective of saving of use of gasoline fuel without affecting mechanical drive or entailing explosion or implosion shocks or insufficiency in oil supply.

As a rule, ordinary automobiles using gasoline as fuel will call for release of accelerator while going downhill or changing to low speeds from higher speeds or executing a brake action, even if the throttle valve in the carburetor is at the minimum position or that transmission of drive is achieved reversely by rear wheel traction as rotation of the engine is started up for certain vehicles, the consequence is that the engine will induce a strong vacuum absorption on the underside of the throttle valve (larger than the idle speed), to the effect gasoline would be grossly absorbed from the oil nozzle of the mixed gas that would eventually account for the incomplete combustion of the fuels, the condition could become even worse to keep combustion of the fuel going even in the exhaust passage, thus not only causes wastes of energy but also adding more negative factors to the ecological issues.

A method to save fuel oil that prevails currently is to reduce the amount of the oil to be squirted out by reducing the size of the oil nozzle, ignoring the fact that there is a prescribed ratio for the mixing of normal mixed gases, attenuation of the mixed gas will inevitably give rise to improper combustion, worsening of acceleration characteristics and even explosive shocking of the engine thus rendering the engine faulty easily, shortening service life of the engine and bringing unnecessary troubles to the driver.

There is often the case that to save the oil fuel, the driver would let the car glide along downhill or travel along at Neutral Gear position when the car is going at extremely high velocity, and that is very dangerous indeed in case of shifting of center of gravity or of an emergency condition because of the absence of engine drive whatever to keep the car under control. (The competent traffic code forbids travelling at Neutral Gear of any land vehicle downhill).

BRIEF DESCRIPTION OF THE DRAWINGS

The sole FIGURE is a cross-sectional view of the preferred embodiment of the invention.

DETAILED DISCRIPTION

Referring to the FIGURE it is seen that the subject low speed air bleed absorption reducer oil saving device 10 for use with carburetor of automobiles is meant chiefly to have an air intake by-pass porthole 16 provided on the bleed pipe 14 of the low speed oil network 12, by means of an adapter 18 the bypass porthole 16 is connected to the outlet 22a of an intake control mechanism 18, the intake control mechanism 18 being composed of a base lid 28 shaped like a pan disk and provided with extensible tubing 26 at the bottom thereof, an upper lid 32 serving as a hood over the base lid 28, a chamber 24 adjoining the upper lid 32 with intake aisle 30 and exit aisle 22, a rubber plug 36 fitted unto the film piece 34 that is set between the base lid 28 and the upper lid 32, serving to control the access of the outlet port 22b, a pipe joint 38 screw-matched to the tubing 26 of the base lid 28, the pipe joint 38 is connected to the manifold 44 of the gas access tubework 42 that goes to the engine, to adjust the elastic tension of the spring 40 that is set between the pipe joint 38 and the film piece 34 to ensure that the rubber plug 36 that is fitted upon the film piece 34 will normally receive the thrust due to spring 40 so as to shut up the exit port 22b.

An automobile or other land vehicle incorporated with the low speed air bleed absorption reducer oil saving device for the carburetor will function to have the throttle valve 60 in the carburetor shut up at a minimal position as the accelerator is released when the automobile is running downhill or changing from a higher speed to a lower speed or is on the point of effecting a braking action, to follow that, the engine will engender a lot of momentous vacuum absorption on the underside of the throttle valve 60, which in turn will pull down the film piece 34 of the intake control mechanism 18 and serve to have the rubber plug 36 as provided on the film piece 34 detached from the shut-up position with respect to the exit port 22b, this amounts to say that the exit port 22b is forced to open as a result thereof, now since that the intake aisle 30 is connected to the air purifier A, so the air fed in from the air purifier A will get stuffed and packed in the bleed pipe 14 of the low speed oil circuit 12 by way of the exit passage 22 and the by-pass porthole 16 and thence find their way into the cylinders, the process related above will serve to fill air refills into the cylinders to help reach a complete combustion of the gasoline so as to reduce waste of fuels, and furthermore, the reduction of absorption of the carburetor thus achieved will serve to greatly reduce in the oil feeding of the oil nozzle thus achieving the objective of oil savings.

The air intake control mechanism 18 as related herein before will function to put the throttle valve in the carburetor to open to a larger position as the automobile incorporated with the subject invention is accelerated to travel at higher speeds, to the effect that as the absorption from the engine is stepped down, the film piece 34 will get restored to original position automatically under the resilience of spring 40 and consequently set the rubber plug 36 to close up the exit port 22b once again.

I claim:

1. A low-speed air bleed absorption reducer fuel-saving device for connection to the fuel intake tube and the valve of a carburetor for use to save fuel fed to the engine of a land vehicle when the land vehicle to which it is connected is travelling downhill, changing from a lower speed to a higher speed by virtue of gear shifting, or on the point of executing a braking action, the fuel saving device comprising an air intake control mechanism having a connection to an air purifier, an air intake bypass porthole connected to said intake control mechanism, a low speed fuel network connected to said bypass porthole and to the engine of the land vehicle to feed the cylinders of the engine, said air-intake control mechanism including
a valve gate to block and unblock said air intake bypass porthole from said connection to the air purifier, said airtake control mechanism having a connection to the fuel intake tube of the carburetor and to a throttle valve of the carburetor and means connected to said valve gate to automatically move said valve gate between blocking and unblocking positions, with vacuum in the fuel intake tube when the throttle valve is closed moving said means and said valve gate to an unblocking position allowing air from said connection to the air purifier into said air intake contol mechanism to said bypass porthole into said low-speed fuel network to feed the air to the cylinders of the engines.

2. The fuel saving device of claim 1, further characterized by
said air intake control mechanism further including a base lid,
said connection to the fuel intake tube of the carburetor including an extensible tubing connecting said base lid to the fuel intake tube,
a top lid enwrapping over said base lid,
a chamber annexed onto said top lid and having intake and exit aisles into and out of said chamber,
said means to automatically move said valve gate including a film piece fixed between sad base lid and said top lid,
said valve gate including a plug means fixed unto said film piece to control access to said exit aisle,
adjustable spring means to adjust the thrust of said plug means to allow said plug means to have sufficient thrust force to seal closed said exit aisle.

3. The fuel saving device of claim 2, further characterized by
said adjustable spring means including a pipe joint screw-matched to said extensible tubing and having a passage therethrough for connection to the fuel intake tube of the carburetor, and a spring connected between said pipe joint and said film piece for adjustment by movement of said pipe joint to regulate elasticity of said spring between said pipe joint and said film piece.

* * * * *